United States Patent [19]

Sawada et al.

[11] Patent Number: 5,056,703
[45] Date of Patent: Oct. 15, 1991

[54] METHOD OF SPLICING WEBS

[75] Inventors: Hirokazu Sawada; Tsutomu Kakei; Masaya Matsuki, all of Shizuoka, Japan

[73] Assignee: Fuji Photo Film Co., Ltd., Kanagawa, Japan

[21] Appl. No.: 536,862

[22] Filed: Jun. 12, 1990

Related U.S. Application Data

[62] Division of Ser. No. 301,564, Jan. 26, 1989, Pat. No. 4,983,241.

[30] Foreign Application Priority Data

Jan. 28, 1988 [JP] Japan .................. 63-017631
Feb. 13, 1988 [JP] Japan .................. 63-031630
Jun. 6, 1988 [JP] Japan .................. 63-139164

[51] Int. Cl.$^5$ .......................... B23K 9/02; B23K 9/23
[52] U.S. Cl. .................... 228/158; 228/189; 228/5.7
[58] Field of Search .......... 228/155, 158, 263.17, 228/5.7; 72/203

[56] References Cited

U.S. PATENT DOCUMENTS

| | | | |
|---|---|---|---|
| 3,421,676 | 1/1969 | Jenkins | 228/5.7 |
| 3,618,844 | 11/1971 | Morley et al. | 228/5.7 |
| 3,654,035 | 4/1972 | Takimoto . | |
| 3,670,398 | 6/1972 | Minton | 228/5.7 |
| 3,736,979 | 6/1973 | Rakich et al. | 228/158 |
| 4,286,744 | 9/1981 | Gullotti et al. | 228/5.7 |
| 4,878,986 | 11/1989 | Nishikawa . | |

FOREIGN PATENT DOCUMENTS 62-179116 11/1987 Japan .

Primary Examiner—Samuel M. Heinrich
Attorney, Agent, or Firm—Sughrue, Mion, Zinn, Macpeak & Seas

[57] ABSTRACT

A method of splicing together leading and following webs which are delivered successively. In the splicing method, when the leading and following webs are different in shape or material from each other, there is interposed between the leading and following webs a dummy web for increasing the strength of splicing of the webs. Also, when the leading and following webs are welded and spliced togethr, the two webs are in part lapped on each other and the lapped portions thereof are cut inclined with respect to the width direction of the webs. After waste materials produced from the cutting are removed, the ends of the webs are butted against each other or slightly lapped on each other and are then welded together. A welded and spliced portion, which includes a fusion portion and a recrystallized portion produced due to heat during welding, is formed such that a difference between the web thickness of the recrystallized portion and the thickness of the adjoining portions of the recrystallized portion is within ±30%.

4 Claims, 6 Drawing Sheets

METHOD OF SPLICING WEBS

This is a divisional of application Ser. No. 301,564 filed Jan. 26, 1989, now U.S. Pat. No. 4,983,241.

BACKGROUND OF THE INVENTION

1. Field of the Invention

The present invention relates to a method of splicing webs and, in particular, to a method of splicing webs such as flexible, strip-shaped metal plates, metal foils, flexible, strip-shaped films and the like.

2. Description of the Related Art

This type of webs splicing method includes a method in which the ends of the webs are superposed on each other and then they are spliced together by means of a two-side adhesive tape or they are fused together by use of supersonic waves to be spliced together, a method of mechanically fitting the webs with each other, and a method of splicing the webs by welding.

Figure 3:
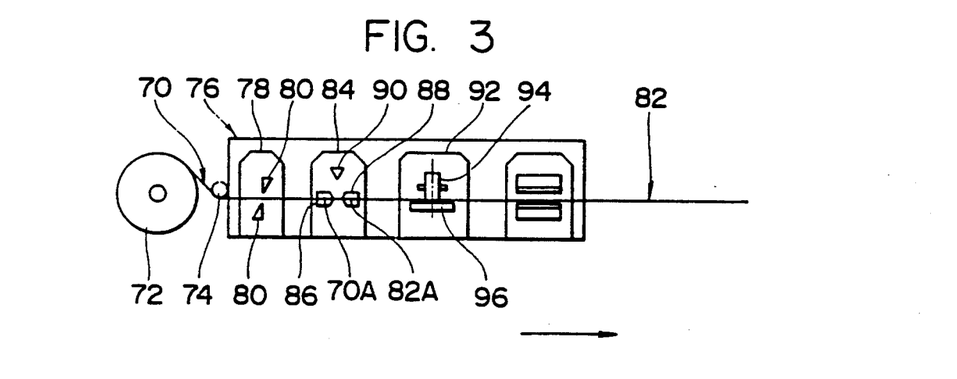
FIG. 3 is a schematic view of a splicing apparatus which is employed in enforcing the present method.

In FIG. 3, there is shown an explanatory view of a conventional method of splicing webs by use of welding. As shown in FIG. 3, a following web 70 is unwound from a roll 72, is transferred to a pass roller 74 and is then delivered to a splicing apparatus 76. The splicing apparatus 76 includes a pre-cut device 78 which is in turn provided with cutters 80, 80. The leading end 70A of the following web 70 is cut by the pre-cut device 78 so that it can be butted accurately against the trailing end 82A of a leading web 82 to be spliced.

Downstream of the precut device 78 there is arranged a welding device 84 which is composed of clamps 86, 88 and a welding torch 90. The leading end 70A of the following web 70 is to be held by the clamp 86 and the trailing end 82A of the leading web 82 is to be held, whereby the following web 70 and the leading web 82 can be butted against each other or slightly lapped on each other. As a welding method, a TIG arc welding method is employed in this case, but other welding methods are also available, including a MIG arc welding, a gas welding, a laser welding using $CO_2$ or YAG, and the like. The welding torch 90 is situated above the butted portions of the webs and is moved in the direction of the width of the respective webs 70, 82 to fuse the web ends 70A, 82A for welding. Also, if the thicknesses of the webs 70, 82 are respectively 0.3 mm or less, the webs 70, 82 to be spliced are fused very easily and, therefore, in such case, it is preferred that the web ends 70A and 82A are slightly lapped on each other before they are welded.

Downstream of the welding device 84 there is arranged a rolling device 92 which includes a rolling roller 94 and a back bar 96. The welded portions of the following web 70 and leading web 82 can be rolled by means of operation of the rolling roller 94.

However, in the above-mentioned conventional web splicing methods, if one of the leading web 82 and following web 70 is two times or more in thickness than the other, it is difficult to set up the splicing conditions when they are spliced by use of the supersonic waves or by welding. Also, if the materials and surface treatments of the webs are different from each other, it is difficult to splice such webs by means of the supersonic waves or by welding.

Since at present a process for carrying or delivering webs is complicated, the above-mentioned inconveniences cause the splicing portions of the webs, while the webs are being carried, to be folded repetitively, thereby producing complete folds in the web splicing portions, or cause the webs to be broken in the splicing portions because the web splicing portions are moved while they are given tension forces by the pass roller and the like. Also, at present there is an increased need for more varieties of products and thus the shapes and materials of the webs must be diversified. However, the conventional splicing methods are not be able to cope with the production plans that include the above-mentioned increasing needs.

Figure 10:
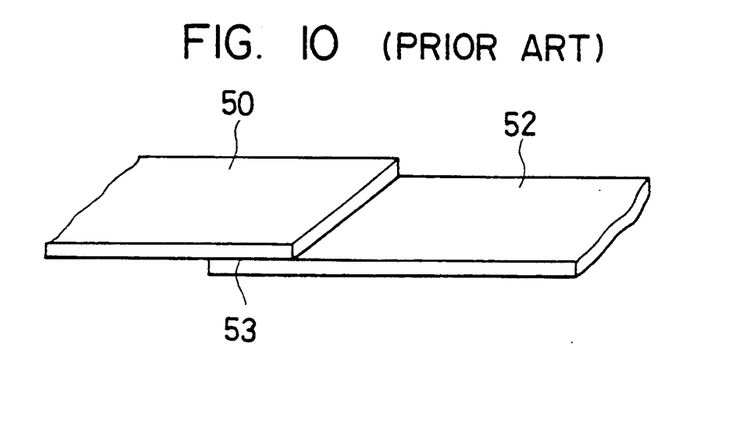
FIG. 10 is a perspective view of the portions that are welded according to a conventional web splicing method.

Referring now to FIG. 10, there is shown a perspective view of a lap splicing method according to the prior art. As shown in FIG. 10, metal webs 50 and 52 are lapped over each other and the splicing portions 53 thereof are bonded by use of a two-side adhesive tape or welded together by use of supersonic waves (see FIGS. 4 and 6 of Japanese Patent Application Laid-open No. 59-24526).

However, with use of the prior art metal plate lap splicing method as shown in FIG. 10, the splicing portions 53 cannot be brought into contact with a pass roller and the like smoothly because the splicing portions are different in level from each other. Also, for example, in a step of coating a light-sensitive layer in manufacturing a plate for use in planography, when the splicing portions of the metal webs with a level difference pass through a coating device, the coating device must be retreated to prevent the metal webs from being damaged or broken. Further, if the coating device is not retreated, then the splicing portions 53 have ill effects on the coated conditions of the webs, resulting in the poor quality of the coated webs.

In addition to the above-mentioned drawbacks, in the prior art method, the whole surfaces of the splicing portions 53 cannot be adhered to each other very often and, as a result of this, there is a possibility that the splicing portion surfaces 53 may peel off while the metal webs are in delivery. And, in a method which includes a surface treatment step by use of a treatment solution, when the metal webs are caused to pass through the treatment solution, the treatment solution and the like may permeate into clearances in the splicing surfaces 53, which gives rise to the poor quality of the products in the following steps.

Also, in the above-mentioned prior art splicing methods, because it is necessary to accurately position the butting surfaces of the metal webs with respect to each other, it is difficult to butt the butting surfaces against each other quickly and accurately, thus resulting in a lengthy operation. On the other hand, the operation to splice the metal webs is performed while they are being delivered and, therefore, in order to carry out the splicing operation without stopping the delivery line, an accumulator is used. However, the capacity of the accumulator is limited, and thus the time that can be allotted for the splicing operation is also limited. For these reasons, when the splicing operation takes longer than the time allotted for the splicing operation the delivery line is forced to stop.

Figure 13:
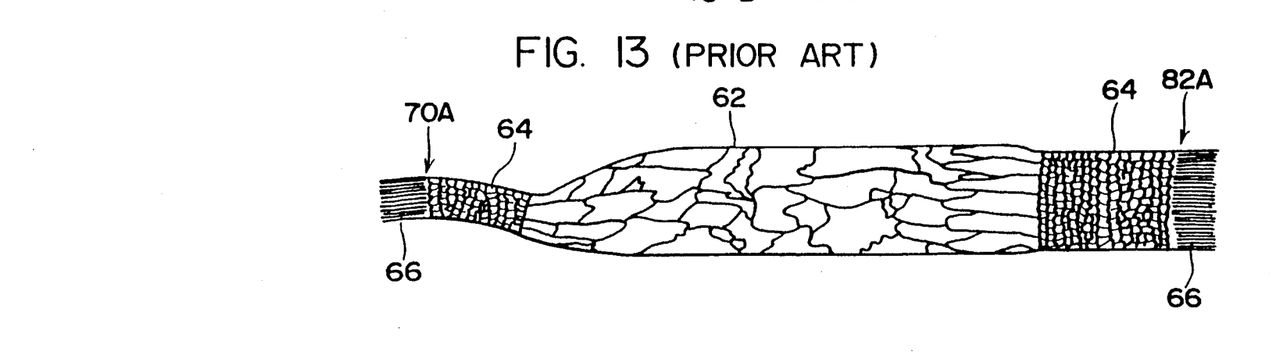

Referring further to FIG. 13, there is shown an observation view of the metal constitution of the sections of the welded, spliced portions of an aluminum plate having a thickness of 0.15 mm and an aluminum plate having a thickness of 0.3 mm which are lapped by 1.0 mm on each other and welded together by use of a TIG arc welding. As shown in FIG. 13, when the end portions 70A and 82A of the metal webs that are cold rolled are spliced, then in the spliced portions thereof there is produced a fusion portion 62, which has been first fused and then solidified, and in the peripheries of the fusion portion 62 there are produced recrystallized portions 64, 64, which have been heated by welding for a given period of time and thereby have been recrystallized. In other words, the welded splice portions of the cold rolled metal webs include the fusion portion 62 that has been fused and solidified and the recrystallized portions 64, 64 that has been recrystallized under the influence of heat during welding. And, in the peripheries of the welded spliced portions, there also are present mother material portions (which are the original metal webs) 66 in which none of the above-mentioned fusion, solidification and recrystallization phenomena have occurred at all. That is, there are formed three metal structures in the spliced portions of the metal webs. Also, the welded splice portions of the metal webs that have not been cold rolled can be classified into three metal structures, namely, a fusion portion, a recrystallized portion, and a mother material portion.

However, when the metal webs are welded and spliced according to the conventional welding and splicing methods, then the welded and spliced portions of the metal webs are sometimes different in thickness from the original metal webs. Also, when thin webs are lapped on each other by 2 mm or so, preferably 0.5 mm ~1.5 mm and welded together to be spliced to each other, the thickness of the welded and spliced portions are greater than that of the original metal webs. If the thickness of the welded and spliced portions of the metal webs are greatly different from that of the original metal webs, when the metal webs having such welded and splice portions are passed over a large number of pass rollers, then a stress concentration will occur in the welded and spliced portions, which may cause the welded and spliced portions to be broken. Especially when metal webs, which are different in thickness from each other, are spliced, then the stress concentration is outstandingly great.

Also, because of the mother material portion 66 > the recrystallized portion 64 ≧ fusion portion 62 in hardness and tensile strength, if a bending stress is given to a metal web having, structure in the order of the mother material portion, recrystallized portion and fusion portion, then the stress may be concentrated on the portion where the change of the thicknesses is great and, in this case, the recrystallized portion having a poor breaking proof strength is situated in such portion. For this reason, if the metal webs having the spliced portions spliced according to the prior art splicing methods are passed over a large number of pass rollers, there is a possibility that they may be broken in a short time.

SUMMARY OF THE INVENTION

The present invention aims at eliminating the drawbacks found in the above-mentioned prior art splicing methods.

Accordingly, it is an object of the invention to provide a method of splicing webs in which, even if the webs to be spliced are different in shape or in material from each other, a sufficient strength can be obtained in the spliced portions thereof and thus the webs can be safely passed over a pass roller and the like.

Also, it is another object of the invention to provide a method of splicing webs which, when the ends of the webs inclined at an angle of 5° or more with respect to the width direction of the web are butted against each other or are lapped slightly on each other for welding, is capable of cutting quickly and accurately the butted or slightly lapped ends of the webs and of reducing the time necessary for splicing the webs.

It is a further object of the invention to provide a method of splicing webs which is capable of increasing the strength of the welded and spliced portions of the webs, in particular, the strength of the portions of the welded and spliced portions in which a stress concentration will occur easily to thereby prevent the welded and spliced portions of the webs from being broken.

In order to attain the above objects, according to the invention, the webs are not directly spliced to each other, but a dummy web is interposed between the webs for splicing them to each other.

That is, according to this aspect, since, when the webs differing in shape or material from each other are to be spliced together, the shape or material of the dummy web can be made to closely resemble those of the webs to be spliced, the splicing conditions of the webs can be set with ease and the thus spliced portions of the webs can show a sufficient strength to thereby cope flexibly with changes in a production plan or a large-variety and small-quantity production.

Also, according to another aspect of the invention, the webs are superposed or lapped in part on each other, the lapped portions thereof are inclined at an angle of 5° or more with respect to the width direction of the webs and are then cut, and the cut and butted surfaces thereof are welded together.

According to the above-mentioned web splicing method, the webs are partly lapped over each other and the lapped portions thereof are then inclined at an angle of 5° or more with respect to the width direction of the webs and are then cut by a cutter or the like. Therefore, in the cut and butted surfaces of the webs, an accurate butting can be achieved simultaneously with the cutting, so that the welding can be carried out immediately while maintaining such accurate butting. This eliminates the operation to position the butted surfaces of the webs with respect to each other and thus the time to be allotted for the splicing operation can be reduced to a great extent.

According to a further aspect of the invention, in a method of splicing webs in which the ends of the webs are welded and, in the thus welded and spliced portions of the webs, there are formed a fusion portion and a recrystallized portion which is produced under the influence of heat during the welding, the improvement which comprises: the welded and spliced portion is formed such that a difference of web thickness between the fusion and recrystallized portions is within 30%, and a difference of web thickness between the recrystallized portion and the portion that is not affected by heat during the welding is within 30%.

According to the above-mentioned web splicing method, the recrystallized portion, which provides the portion that may be broken most easily in the welded and spliced portions, is formed such that its web thickness difference is held within 30% with respect to the adjoining fusion portion and the portion that is not affected by heat during the welding, whereby, when a tensile force or a bending stress is given to the webs, such tensile force or bending stress cannot be concentrated on the recrystallized portion easily. Therefore, even when the webs having the thus welded and spliced portions are passed over a large number of pass rollers under tensile forces, the spliced portions of the webs cannot be broken because of its increased strength.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE PREFERRED EMBODIMENTS

Detailed description will hereunder be given of the preferred embodiments of a method of splicing webs to each other according to the present invention with reference to the accompanying drawings.

Figure 1:
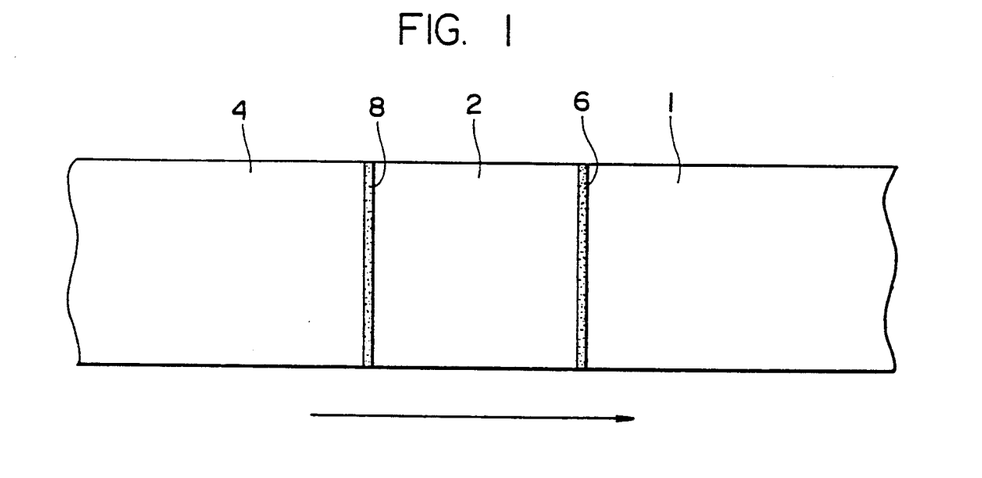
FIG. 1 is a plan view of the spliced portions of webs which are different in thickness from each other and are spliced to each other in a method according to the invention.

Referring first to FIG. 1, there is shown a plan view of the spliced portions of webs which are spliced together in a web splicing method according to the present invention. As shown in FIG. 1, the trailing end of a leading web 1 is connected through a dummy web 2 to the leading end of a following web 4. The leading web 1 is formed so as to be smaller in thickness than the following web 4, that is, the thickness of the leading web 1 is equal to or less than a half of the thickness of the following web 4. Also, the surfaces of the leading and following webs 1 and 4 have been treated with a rolling oil.

The dummy web 2 is formed of a de-fatted material and it is also made of a material which has a modulus of longitudinal elasticity smaller than those of the leading and following webs 1 and 4. The length of the dummy web 2 is sufficiently short with respect to the leading and following webs 1 and 4. In particular, it is on the order of 200 mm to 5,000 mm and, preferably, it may be 1,000 mm or so. Also, the dummy web 2 is thicker than the thin, leading web 1 and is thinner than the thick, following web 4. Preferably, the thickness of the dummy web may be set such that it is in the range of 1 to 2 times that of the leading web 1 and also in the range of about a half to 1 time that of the following web 4.

Figure 2:
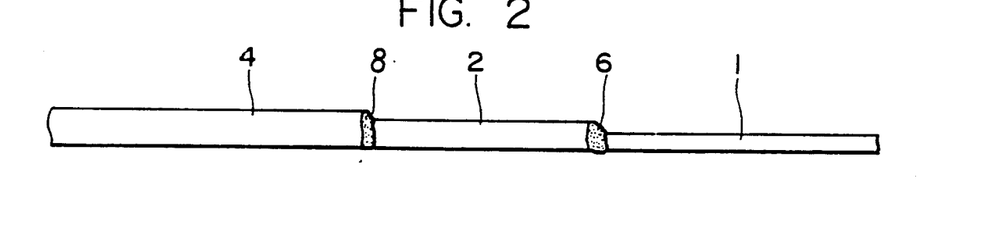
FIG. 2 is a side view of the spliced portions of the webs shown in FIG. 1.

The two ends of the dummy web 2 are butted against and spliced to the ends of the leading web 1, and following web 4, respectively, or they are lapped slightly on and spliced to the ends of the leading and following webs 1 and 4 by welding, respectively. And, the spliced portions 6 and 8 are then treated by rolling, respectively. The welding is executed from above the spliced portions. The welding methods that can be used for this purpose include a TIG arc welding, a MIG arc welding a gas welding, a laser welding using $CO_2$, YAG or the like, and other welding methods. Actually, one of them may be selected and used according to the kinds of the leading web 1, following web 4 and dummy web 2.

According to the web splicing method of the invention constructed in the above-mentioned manner, the leading web 1 and the following web 4 are not welded and spliced directly to each other, but they are spliced together through the medium of the dummy web 2. That is, the leading web 1 and the following web 4 are spliced indirectly by use of the dummy web 2 as a medium. Thanks to this, when there is a great difference between the thicknesses of the leading and following webs 1 and 4, the conditions for splicing the dummy web 2 to the leading and following webs 1 and 4 can be set easily because the thickness of the dummy web 2 is approximate to the thicknesses of the leading and following webs 1 and 4. Also, the indirect splicing through the medium of the dummy web 2 can increase the strength of the spliced portions thereof.

Also, due to the fact that the dummy web 2 is formed of a de-fatted material, even when the leading and following webs 1 and 4 have been treated with a rolling oil or the like, the welding can be achieved with ease and thus the welded portions thereof can be strengthened.

In the above-mentioned embodiment, the use of the dummy web 2 when the leading and following webs 1 and 4 are different in thickness from each other has been described, but, however, the use of the dummy web 2 is not limited to this, that is, the dummy web can also be used when the leading and following webs 1 and 4 are different in width from each other. In particular, when the width of the leading web 1 is greater than that of the following web 4, there is employed a dummy web 2 whose width is smaller than that of the leading web 1 and greater than that of the following web 4. Preferably, the web width of the dummy web should be set in the range of approximately 0.8 to 1 time that of the leading web 1 and in the range of approximately 1 to 1.25 times that of the following web 4. Accordingly, when the webs differing in width from each other are to be spliced together as well, since the width of the dummy web 2 is approximate to those of the leading and following webs 1 and 4, the spliced portions thereof can be strengthened to a sufficient degree.

By the way, although in the above-mentioned embodiment, the leading and following webs 1 and 4 are spliced together by welding, this is not limitative, but they may be spliced by use of ultrasonics, or by a method of mechanically fitting, etc.

The web that is used in the present invention includes paper, a plastic film, metal, resin-coated paper, synthetic paper and the like. The material for the plastic film includes polyolefine such as polyethylene, polipropylene and the like, vinyl polymers such as poly vinyl acetate, poly vinyl chloride, poly-sytrene and the like, polyamide such as 6-nylon and the like, polyester such as polyethylene telephthalate, polyethylene-2, 6-naphthalate and the like, cellulose acetate such as polycarbonate, cellulose triacetate, cellulose di-acetate and the like., and other similar materials. Also, as the resin that is used for the resincoated paper, polyolefine including polyethylene and the like is representative, but this is not always limitative. Further, as the metal web, there is available an aluminum web, for example.

Next, description will be given below of comparison tests in which the webs spliced together according to the web splicing method of the invention are compared with the webs spliced together according to the prior art web splicing method.

(EMBODIMENT 1)

An aluminum web having a thickness of 0.15 mm and a width of 200 mm was used as the leading web, an aluminum web having a thickness of 0.40 mm and a width of 200 mm was used as the following web, a web having a thickness of 0.30 mm and a width of 200 mm was used as the dummy web and and interposed between the leading and following aluminum webs, and then the webs were slightly lapped and spliced together by use of a TIG arc welding machine. A sample that had been obtained from the above splicing was given a tensile force of 40 kg and was made to go around a circumference which consists of ten rubber rollers each $\phi$ 100 wherein $\phi$ is the diameter of the rollers in mm, and ten rubber rollers each of $\phi$ 150. How many times the sample had to go around the circumference before it was broken was examined. That is, a pass roller passing test was conducted. The results in this test are shown in Table 1.

(EMBODIMENT 2)

An aluminum web of an A6000 system having a thickness of 0.30 mm and a width of 200 mm was used as the leading web, an aluminum web of an A6000 system having a thickness of 0.15 mm and a width of 200 mm was used as the following web, an aluminum web of an A1000 system having a thickness of 0.30 mm and a width of 200 mm was used as the dummy web and interposed between the leading and following aluminum webs, and then the webs were slightly lapped and spliced together by use of a TIG arc welding machine.

The resultant sample, while a tensile force of 40 kg was being applied thereto, was made to go around a circumference consisting of ten rollers each of $\phi$ 100 and ten rollers each of $\phi$ 150 and the pass roller passing test was conducted on the sample. That is, it was examined how many times the sample had to go around the circumference before it was broken. The results obtained from this test are shown in Table 2.

TABLE 1

| Leading Web t0.15 mm - Following Web t0.40 mm | Number of Rounds Before Cutting |
| --- | --- |
| Dummy Web t0.30 mm Was Used (Embodiment) | 11 Rounds |
| Dummy Web Was Not Used (Comparison) | 3 Rounds |

TABLE 2

| Leading Web t0.30 mm - Following Web t0.15 mm | Number of Rounds Before Cutting |
| --- | --- |
| Dummy Web of A1000 System t0.30 mm Was Used (Embodiment) | 50 Rounds |
| Dummy Web Was Not Used (Comparison) | 19 Rounds |

As shown in Tables 1 and 2, when the splicing is carried out by use of a dummy web, the number of rounds can be increased.

In this manner, the above-mentioned web splicing method is capable of satisfying the needs of such a production plan that requires the splicing of various kinds of webs. That is, even if the shapes or materials of the webs to be spliced are different from each other, the webs can be spliced together with ease and with a sufficient strength and the thus spliced webs can be made to pass safely over the pass rollers and the like. Also, according to the present splicing method, no inconvenience can be incurred in the following treatment steps.

Next, description will be given below of another embodiment of the web splicing method according to the present invention.

Figure 4:
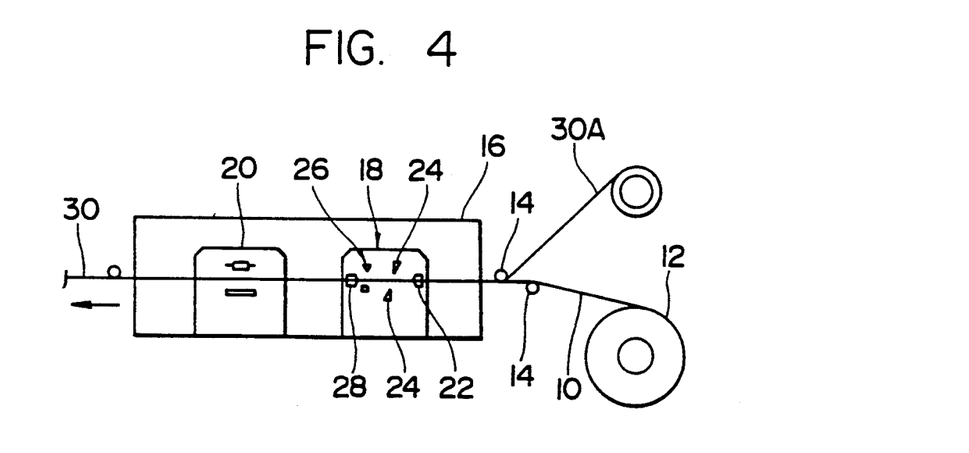
FIG. 4 is a schematic view of an embodiment of a splicing apparatus which is employed in enforcing the present method of splicing together strip-shaped metal webs.

Referring now to FIG. 4, there is shown a schematic view of an embodiment of a splicing apparatus which is used in enforcing the present invention. As shown in FIG. 4, a web (a metal web) 10 is wound back from a roll 12, moved to a pass roller 14, and is then delivered to a splicing apparatus 16. The shown splicing apparatus 16 is composed of a butting device 18 and a rolling device 20.

Figure 5:
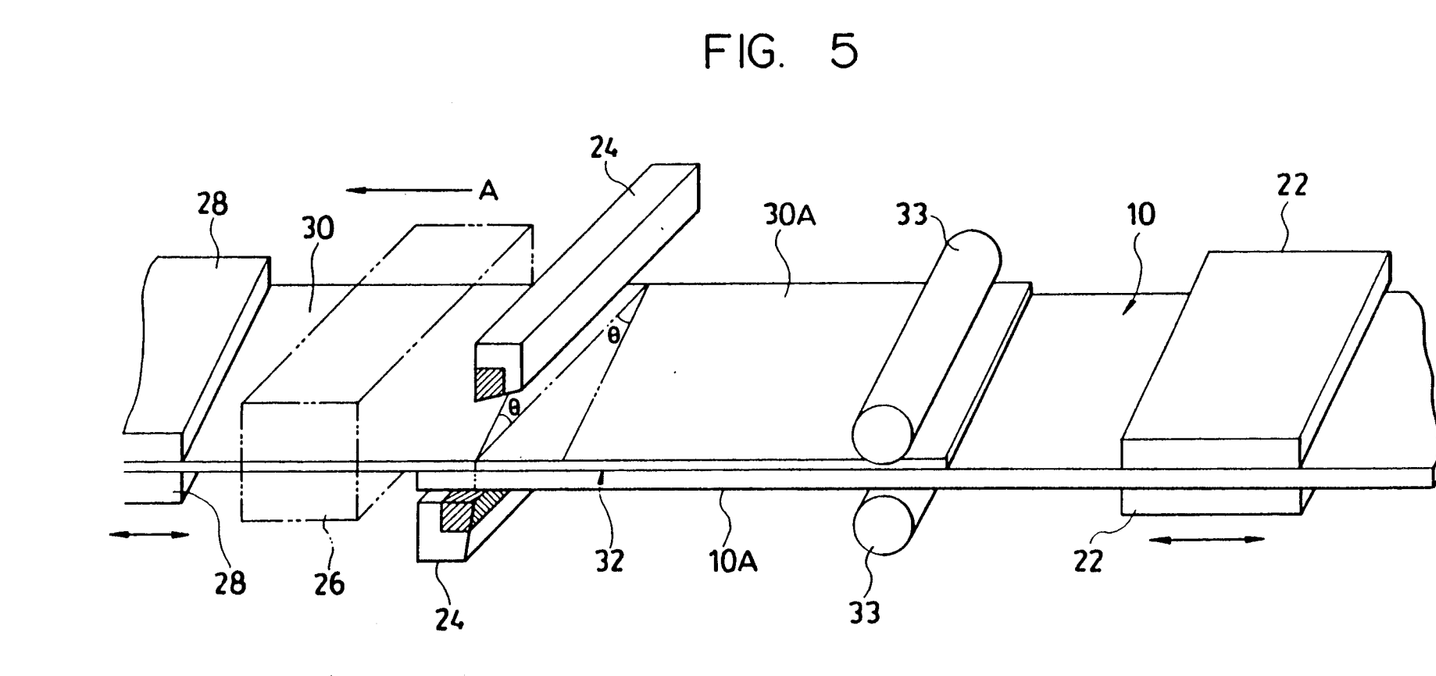
FIG. 5 is a perspective view of a butting device included in the splicing apparatus shown in FIG. 4.

The butting device 18 is composed of a clamp 22, a pair of cutters 24, 24, a welding device 26, and a clamp 28. As shown in FIG. 5, the leading end 10A of the metal web 10 coming from the roller 12 is held bY the clamp 22, while the trailing end 30A of a metal web 30 to be spliced to the metal web 10 is held by the clamp 28. Also, the leading end 10A of the metal web 10 and the trailing end 30A of the metal web 30 are lapped on each other, and the lapped portions 32 thereof are held by at least a pair of nip rollers 33 and 33.

The pair of cutters 24, 24 are respectively disposed above and below the lapped portions 32 of the metal webs 10, 30, and are inclined at an angle of $\theta$ with respect to the width direction of the metal webs 10 and 30. The angle of should be set to be equal to or more than 5° and, preferably, it may be set at 25° or so. By the way, as a cutter to cut the metal webs 10, 30, a shear cutter and a cutter of a slitter system including a gehberu edge type or a clearance cut type cutter and the like may be used. These cutters may be selected according to the thicknesses and materials of the metal webs to be cut.

Figure 6:
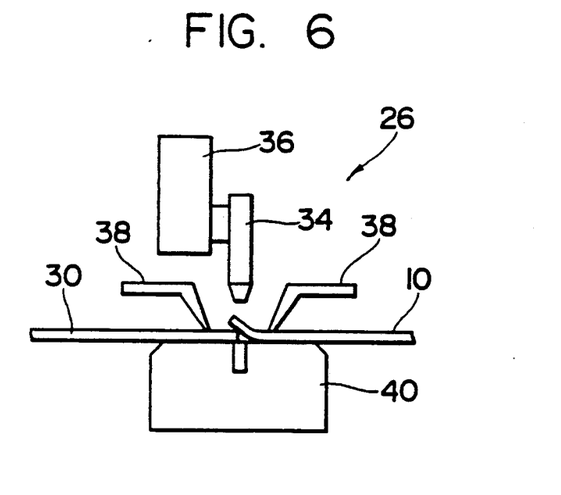
FIG. 6 is an explanatory view of a welding device included in the splicing apparatus shown in FIG. 4.

Also, the welding device 26 is disposed close to the cutters 24, 24 and, as shown in FIG. 6, the welding device 26 is composed of a welding torch 34, a unit 36 for moving the welding torch 34, two welding clamps 38, 38, and a welding back bar 40. In particular, the welding device 26 is a high-frequency pulse arc welding mechanism. The welding torch 34 is, as in the cutters 24, moved by the moving unit 36 in such a manner that it is inclined at the angle of $\theta$ with respect to the width direction of the metal webs 10, 30, and is used to weld the surfaces of the metal webs 10, 30 to be spliced together. The welding method that can be used for this purpose includes a TIG arc welding method, a MIG arc welding method, a gas welding method, a laser welding method using $CO_2$, YAG or the like, and so on. These welding methods may be selected and used according to the kinds of the metal webs.

The rolling device 20 rolls the welded portions of the metal webs 10, 30 by use of rolling rollers. Such rolling treatment is used to remove a level difference produced between the welded and spliced portions of the metal webs and it is necessary especially when the metal webs 10, 30 are lapped slightly on each other and then welded together. Also, the rolling treatment is sure to increase the strength of the splicing of the metal webs. This is because the tensile strength of the webs lowered due to the welding treatment can be recovered by the rolling treatment, that is, by means of the hardening of the webs.

Figure 7:
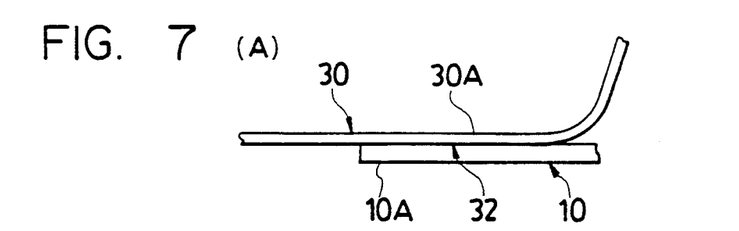
FIGS. 7(A) through (F) are respectively explanatory views of a process for splicing the strip-shaped metal webs to each other according to the invention.
Figure 8:
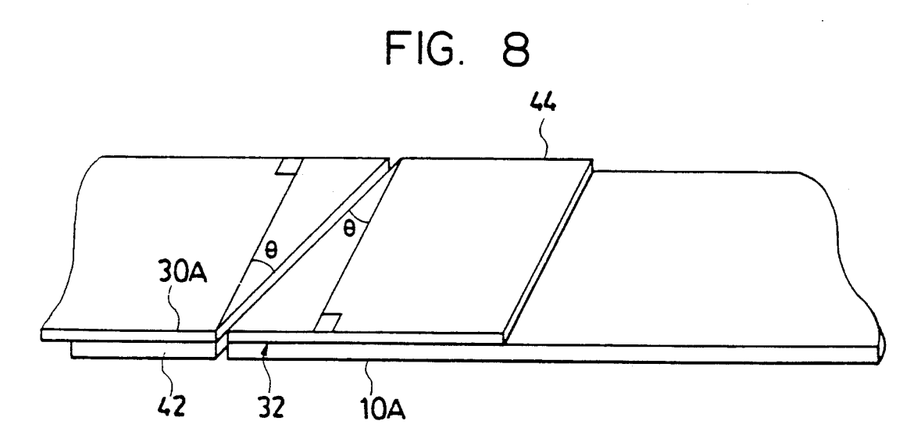
FIG. 8 is a perspective view of the splicing portions of the webs when they are cut.

According to the above-mentioned web splicing method of the invention, in the butting device 18, the metal web 10 is held by the clamp 22 and the metal web 30 is held by the clamp 28. And, as shown in FIG. 7(A), the ends 10a, 30A thereof are lapped on each other and the lapped portions 32 are held by the nip rollers 33, 33 shown in FIG. 5. Next, as shown in FIG. 7(B), the lapped portion 32 is cut by the cutters 24, 24 in such a manner that it is inclined at the angle of $\theta$ (25°) with respect to the width direction of the metal webs 10, 30, as shown in FIG. 8.

As shown in FIG. 7(C), a waste 42 cut off from the metal web 10 is allowed to drop down by gravity, while a waste 44 cut from the metal web 30 is removed by a removing device (not shown). After the metal webs are cut, the clamps 22 and 28 are moved in synchronization with each other in the direction of an arrow A in FIG. 5 while holding the metal webs 10, 30, so that the butted surface of the metal web 10 formed by cutting and the butted surface of the metal web 30 similarly formed by cutting are respectively located at the center of the welding back bar 40 of the welding device 26. Also, when the thicknesses of the metal webs 10, 30 are smaller, the clamp 22 is moved further by 0.5mm to 1.5 mm than the clamp 28 and thus the metal webs are lapped by a slight amount on each other, as shown in FIG. 7(D). This is enforced especially when the thickness of the metal web is equal to or less than 0.3 mm, because such partial lapping can prevent the formation of a blow hole.

Figure 9:
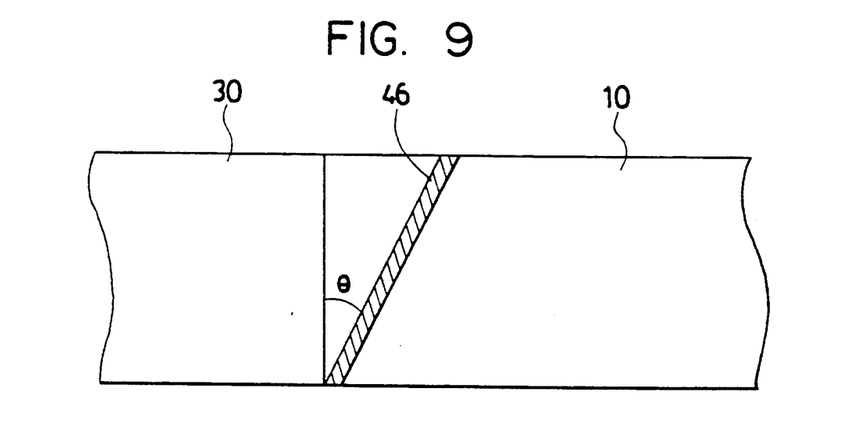
FIG. 9 is a plan view of the splicing portions of the strip-shaped metal webs.

Then, the welding torch 34 is moved in such a manner that it is inclined at the angle of $\theta$ with respect to the width direction of the metal webs and, as shown in FIG. 9, the butted surfaces of the metal webs 10, 30 are welded together. Also, when there is a level difference in the welded portion 46, the welded portion is rolled by the rolling device 20, so that, as shown in FIG. 7(F), the level difference in the welded portion 46 is removed to thereby complete the splicing of the webs.

In this case, as shown in FIGS. 7(B) and (C), when the capped portion 32 of the metal webs 10, 30 are cut by the cutters 24, 24, the butted surfaces of the metal webs 10, 30 are held by the clamps 22, 28 in such a manner that they are accurately butted against each other. And, while keeping a sufficient bitting accuracy, the metal webs 10, 30 are welded together. For this reason, there is eliminated the need to position the butting surfaces of the metal webs with respect to each other as in the prior art, whereby the time necessary for the operation for splicing the metal webs 10, 30 can be reduced.

Also, according to the invention, the welded and spliced portion 46 is formed inclined at angle of 5° or more with respect to the width direction of the metal webs 10, 30, so that the welding strength is increased when compared with the prior art welding and splicing method in which a welded and spliced portion is formed in the width direction of metal webs to be spliced.

As described above, according to the above-mentioned web splicing method of the invention, the webs are partly lapped on each other and, after the lapped portion of the webs is cut, the webs are welded and spliced together, whereby the butting surfaces of the webs can be butted against each other with accuracy and the time required for the web splicing operation can be reduced accordingly.

Next, description will be given below of another embodiment of a web splicing method according to the invention.

Figure 11:
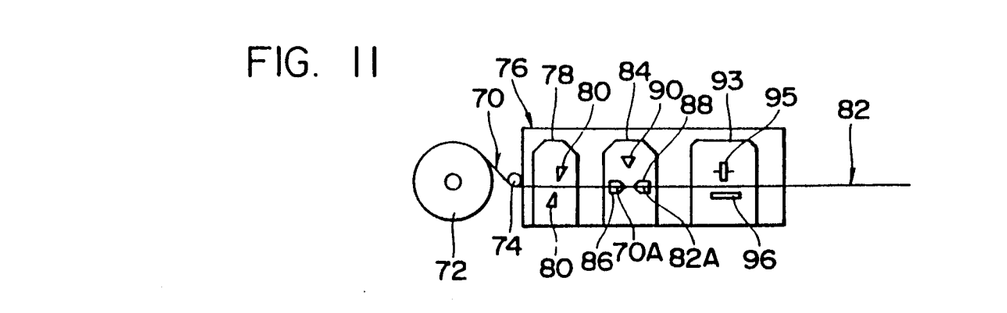
FIG. 11 is a schematic view of another embodiment of the splicing apparatus employed in enforcing the present method.

In FIG. 11, there is shown a schematic view of another embodiment of a splicing apparatus which is used in enforcing the present web splicing method. In this figure, the parts that are used in common with the splicing apparatus in FIG. 3 are given the same designations and the description thereof is omitted here. The splicing apparatus in FIG. 11 is different from that in FIG. 3 in respect of a rolling device, which will be discussed later.

As shown in FIG. 11, a thin metal web 70 is rewound from a roll 72, is moved to a pass roller 74, and is then delivered into a splicing apparatus 76. And, the leading end 70A of the thin metal web 70 is cut by a pre-cut device 78 so that it can, be accurately butted against the trailing end 82A of a thick metal web 82 to be spliced or can be lapped by a slight amount on the trailing end 82 of the thick metal web 82.

However, when the leading end 70A of the metal web 70 rewound from the roll 72 can be directly butted against or slightly lapped on the trailing end 82A of the metal web 82 with accuracy, the pre-cut device 78 is not used.

The leading end 70A of the thin metal web 70 is held by a clamp 86 and the trailing end 82A of the thick metal web 82 is held by a clamp 88, whereby the thin metal web 70 and the thick metal web 82 are butted against or lapped slightly on each other. When they are lapped slightly on each other, it is desired that the webs 70, 82 are lapped on each other by about 2 mm, preferably, by 0.5 mm to 1 mm before they are welded together. Especially when the thickness of the metal webs 70, 82 is equal to or less than 0.3 mm, the metal webs 70, 82 may be slightly lapped in part on each other and welded together to thereby prevent the formation of a blow hole or the like.

Also, the welding by the welding torch 90 of the welding device 84 is carried out from above the butted portion and, after welded, there is produced a welded and spliced portion 60 in the metal webs 70, 82.

Downstream of the welding device 84 there is arranged a rolling device 93, in which the welded and spliced portion 60 in the ends 70A, 82A of the metal webs is rolled.

Figure 12:
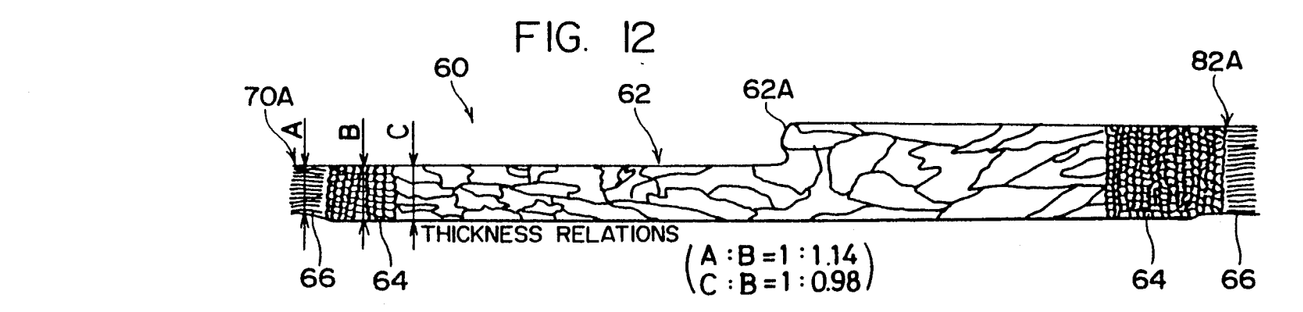
FIG. 12 is an observation view of the metal structure of the section of the welded and spliced portions of the webs that are spliced together in a web splicing method according to the invention; and, FIG. 13 is an observation view of the metal structure of the section of the welded and spliced portions of the webs that are spliced together in a web splicing method according to the prior art.

As shown in FIG. 12, the spliced portion 60 in the metal web ends 70A, 82A is completely fused when the metal webs are welded, whereby there is produced a fusion portion 62 whose structure is different from the inherent structure of the metal webs. Also, adjacently to the fusion portion 62, there are produced recrystallized portions 64, 64 due to the effects of heat in welding.

A rolling roller 95, which is provided in the above-mentioned rolling device 93, is adapted to selectively roll the portion that is situated adjacent to the recrystallized portion 64 on the side of the thin metal web so that its thickness becomes substantially equal to that of the mother material 66 of the thin metal web 70. Also, substantially in the central portion of the fusion portion 62, there is formed a level difference 62A. Further, when the two webs to be spliced together are equal in thickness to each other, the whole welded and spliced portion including the two recrystallized portions 64, 64 is to be rolled.

The recrystallized portion 64 is rolled by the above-mentioned rolling device 93 in such a manner that its thickness may be in the range of 70% ~ 130%, preferably, in the range of 85% ~ 115% with respect to the thickness of the fusion portion 62, and may be in the range of 70% ~ 130%, preferably, in the range of 85% ~ 115% with respect to the thickness of the mother material 66 (the portion that is not affected by heat during welding).

Thanks to this, the thickness of the recrystallized portion 64 is substantially equal to the thicknesses of the fusion portion 62 and the original metal webs (that is, their mother materials), and, therefore, even when the metal webs 70, 82 are moved to the pass roller and the like while a tensile force and a bending stress are being given to the metal webs, a stress is not concentrated on the recrystallized portion 64. This can increase the splicing strength of the welded and spliced portion 60 of the metal webs 70, 82, thereby reducing troubles in a complicated metal web delivery process, for example, in steps for a surface treatment of a planographic plate and a coating/drying thereof.

Next, description will be given below of a test which was conducted to examine the strength of the welded and spliced portion of the metal spliced together according to the abovementioned web splicing method.

Referring to test samples in this case, an aluminum plate having a thickness of 0.15mm and a width of 200 mm is used as the thin metal web 70, and an aluminum plate having a thickness of 0.3 mm and a width of 200 mm is used as the thick metal web 82. While the two metal webs 70, 82 are lapped on each other by 1.0 mm, they are welded together by use of a TIG arc welding method. Then, the resultant recrystallized portion 64 is rolled so that the thickness B of the recrystallized portion 64 becomes 1.14 times the thickness A of the original thin metal web 70 (the portion that is not affected during welding and is cold rolled), and also 0.98 times the thickness C of the fusion portion 62 (FIG. 12).

A comparison sample, which was spliced together according to the prior art web splicing method, was not adjusted in thickness by rolling in the portions thereof adjoining the recrystallized portions 64, 64 (FIG. 13).

The strength test was conducted using the above-mentioned test samples with a tensile force of 75 kg being given to them. That is, the samples were made to go around a circuit which consisting of two rubber rolls ($\phi$ (diameter of rollers in mm) 600), twenty-two rubber rolls ($\phi$ 200) and two rubber rolls ($\phi$ 180), and the number of rounds thereof before they are cut was examined. This is referred to as a pass roller passing test. The results obtained in the pass roller passing test are shown in Table 3.

TABLE 3

| Kinds of Samples | Number of Rounds Before Cutting |
|---|---|
| Prior Art Comparison Sample (Fig. 13) | 7 |
| Test Sample (Fig. 12) | 202 or more |

As shown in Table 3, it was found that the spliced portion obtained by use of the web splicing method according to the invention is much harder to break than that obtained by the prior art method, when it was moved over a large number of pass rollers. Actually, in the pass roller passing test, when test sample had gone 202 times around the circuit, the test was stopped and no breakage or cracks were found in the test sample. Also, for the test sample, the adjacent portion thereof to the recrystallized portion 64 on the side of the thin metal web in FIG. 12 was selectively rolled and, in such rolling, as shown in FIG. 12, there was produced a level difference 62A of about 0.1 mm in the fusion portion 62. However, in fact, no breakage or cracks were produced in the level difference 62A.

Also, in the above-mentioned embodiment, the recrystallized portion 64 is rolled, but this is not limitative. For example, the recrystallized portion 64 may heated again into a fused condition, and a new recrystallized portion may be formed at a place in which a stress concentration is hard to occur.

As has been described hereinbefore, according to the web splicing method of the invention, the recrystallized portion of the welded and spliced portion of the metal webs can be formed such that its thickness is substantially equal to the thicknesses of its adjoining fused portion and the original metal web portion that is not affected during welding, so that the strength of the welded and spliced portion of the metal webs can be increased, thereby preventing the spliced portion from being broken or cut.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. In a method of splicing webs together in which the ends of the webs are welded and spliced together and the thus welded and spliced portion of the webs includes a fusion portion and first and second recrystallized portions which are respectively produced on both sides of said fusion portion due to heat during welding, and a web thickness difference in at least one of a first given region having a boundary surface between said fusion portion and said first recrystallized portion as the center thereof and a second given region having a boundary surface between said fusion portion and said second recrystallized portion as the center thereof is greater than 30%, the improvement which comprises the step of:

forming said welded and spliced portion so that web thickness differences in said first and second given regions are respectively within 30%, and a web thickness difference between said first and second recrystallized portions and a portion of said web which is not affected by heat during welding is within 30%.

2. A method as set forth in claim 1, wherein said forming step of said welded and spliced portion comprises rolling said fusion portion and said first and second recrystallized portions as well as said first and second recrystallized portions and said portion not affected by heat, respectively, after said webs are welded and spliced together.

3. A method as set forth in claim 1, wherein said webs are metal webs which have been cold rolled.

4. A method as set forth in claim 1, wherein said metal webs are aluminum webs.

* * * * *